US012512606B2

(12) United States Patent
Ai et al.

(10) Patent No.: US 12,512,606 B2
(45) Date of Patent: Dec. 30, 2025

(54) MULTIBAND CROSS-DIPOLE RADIATING ELEMENTS AND BASE STATION ANTENNAS INCLUDING ARRAYS OF SUCH RADIATING ELEMENTS

(71) Applicant: Outdoor Wireless Networks LLC, Claremont, NC (US)

(72) Inventors: Xiangyang Ai, Plano, TX (US); Chengcheng Tang, Murphy, TX (US); Peter J. Bisiules, LaGrange Park, IL (US); Rui An, Allen, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 44 days.

(21) Appl. No.: 18/727,582

(22) PCT Filed: Jan. 11, 2023

(86) PCT No.: PCT/US2023/060449

§ 371 (c)(1),
(2) Date: Jul. 9, 2024

(87) PCT Pub. No.: WO2023/137308

PCT Pub. Date: Jul. 20, 2023

(65) Prior Publication Data

US 2025/0125540 A1 Apr. 17, 2025

Related U.S. Application Data

(60) Provisional application No. 63/300,139, filed on Jan. 17, 2022.

(51) Int. Cl.
*H01Q 21/26* (2006.01)
*H01Q 5/15* (2015.01)
(Continued)

(52) U.S. Cl.
CPC ............... *H01Q 21/26* (2013.01); *H01Q 5/15* (2015.01); *H01Q 5/48* (2015.01); *H01Q 5/50* (2015.01)

(58) Field of Classification Search
CPC .......... H01Q 1/246; H01Q 5/15; H01Q 5/321; H01Q 5/48; H01Q 5/50; H01Q 15/006; H01Q 19/108; H01Q 21/26
See application file for complete search history.

(56) References Cited

U.S. PATENT DOCUMENTS

| | | | |
|---|---|---|---|
| 2010/0039343 A1 | 2/2010 | Uno et al. | |
| 2014/0097995 A1 | 4/2014 | Mckinzie | |

(Continued)

FOREIGN PATENT DOCUMENTS

| | | | | |
|---|---|---|---|---|
| CN | 105305098 A * | 2/2016 | .......... H01Q 19/185 |
| WO | 2021125466 A1 | 6/2021 | |
| WO | 2022108769 A1 | 5/2022 | |

OTHER PUBLICATIONS

"International Search Report and Written Opinion of the International Searching Authority", International Application No. PCT/US2023/060449, Jul. 31, 2023, 12 pp.

(Continued)

*Primary Examiner* — Hoang V Nguyen
(74) *Attorney, Agent, or Firm* — Myers Bigel, P.A.

(57) ABSTRACT

Radiating elements comprise a first dipole radiator that includes a first dipole arm and a second dipole arm, a second dipole radiator that includes a third dipole arm and a fourth dipole arm and first through fourth electromagnetic bandgap structures that are coupled to distal end portions of the respective first through fourth dipole arms.

17 Claims, 11 Drawing Sheets

(51) Int. Cl.
*H01Q 5/48* (2015.01)
*H01Q 5/50* (2015.01)

(56) References Cited

U.S. PATENT DOCUMENTS

| | | | |
|---|---|---|---|
| 2014/0111396 | A1 | 4/2014 | Hyjazie et al. |
| 2021/0305721 | A1 | 9/2021 | Li et al. |
| 2023/0010074 | A1 | 1/2023 | Kim |

OTHER PUBLICATIONS

"Invitation to Pay Additional Fees and, Where Applicable, Protest Fee", International Application No. PCT/US2023/060449, May 16, 2023, 3 pp.

* cited by examiner

MULTIBAND CROSS-DIPOLE RADIATING ELEMENTS AND BASE STATION ANTENNAS INCLUDING ARRAYS OF SUCH RADIATING ELEMENTS

CROSS-REFERENCE TO RELATED APPLICATIONS

The present application is a 35 U.S.C. § 371 national stage application of PCT Application No. PCT/US2023/060449, filed on Jan. 11, 2023, which itself claims priority under 35 U.S.C. § 119 to U.S. Provisional Application Ser. No. 63/300,139, filed Jan. 17, 2022, the entire contents of both of which are incorporated herein by reference.

BACKGROUND

The present invention generally relates to radio communications and, more particularly, to base station antennas that support communications in multiple frequency bands Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. In the most common base station configuration, a cell is divided into three 120° sectors in the azimuth plane and a base station antenna is provided for each sector. In such a three-sector configuration, the antenna beams generated by each base station antenna typically have a Half Power Beamwidth ("HPBW") in the azimuth plane of about 65° so that the antenna beams provide good coverage throughout a 120° sector. Note that herein "vertical" refers to a direction that is perpendicular to the horizontal plane that is defined by the horizon, and the azimuth plane refers to a horizontal plane that bisects the base station antenna.

Typically, each base station antenna will include one or more so-called "linear arrays" of radiating elements that includes a plurality of radiating elements that are arranged in a generally vertically-extending column when the antenna is mounted for use. The base station antennas may also include multi-column arrays of radiating elements that can perform active beamforming. The radiating elements used in these arrays typically are dual-polarized radiating elements that are designed to transmit and receive RF signals at two different (and orthogonal) polarizations. The use of dual-polarized radiating elements increases the capacity of a base station antenna as it allows the antenna to transmit and receive twice as many signals with only a small increase in the size of the radiating elements. Most modern base station antennas use so-called slant −/+45° polarized radiating elements that transmit/receive signals at both a −45° linear polarization and a +45° linear polarization.

In order to accommodate the increasing volume of cellular communications, new frequency bands are being made available for cellular service. Cellular operators now typically deploy multi-band base station antennas that include arrays of radiating elements that operate in different frequency bands to support service in these new frequency bands. For example, most base station antennas now include both "low-band" linear arrays of radiating elements that provide service in some or all of the 617-960 MHz frequency band and "mid-band" linear arrays of radiating elements that provide service in some or all of the 1427-2690 MHz frequency band. More recently, many base station antennas include one or more arrays of "high-band" radiating elements that operate in higher frequency bands, such as some or all of the 3.3-4.2 GHz and/or the 5.1-5.8 GHz frequency bands. The high-band arrays (and sometimes some of the mid-band arrays) are often implemented as multi-column arrays of radiating elements that can be configured to perform active beamforming where the shape of the antenna beam generated by the array can be controlled to form higher directivity antenna beams that support higher throughput.

In order to reduce tower leasing costs and to comply with local ordinances and/or zoning regulations that often limit the number of base station antennas that can be mounted on an antenna tower, cellular operators desire base station antennas that include radiating element arrays that support service in several different frequency bands. However, as the number of radiating element arrays included in an antenna increases, the size of the antenna necessarily increases, which increases wind loading (which may require sturdier antenna towers), may violate local zoning ordinances, and may generally be unsightly. While the different arrays of radiating elements can be positioned more closely together to offset some of the increase in the size of the antenna, such an approach reduces the amount of isolation between the arrays, which degrades performance. Thus, it is challenging to provide relatively small base station antennas that support service in several different frequency bands.

SUMMARY

Pursuant to embodiments of the present invention, radiating elements are provided that comprise a first dipole radiator that includes a first dipole arm and a second dipole arm, a second dipole radiator that includes a third dipole arm and a fourth dipole arm, and first through fourth electromagnetic bandgap structures that are coupled to distal end portions of the respective first through fourth dipole arms.

Each electromagnetic bandgap structure may comprise one or more reactively loaded transmission lines and a dipole arm extension.

The radiating elements may be dual band radiating elements that are configured to transmit and receive RF signals in first and second frequency bands, where the second frequency band that comprises higher frequencies than the first frequency band.

In some embodiments, the first dipole radiator may be configured to transmit and receive signals in the second frequency band, and a combination of the first dipole radiator and the first and second electromagnetic bandgap structures are configured to transmit and receive signals in the first frequency band.

In some embodiments, the radiating element is fed by a single feed line per polarization that is configured to pass RF signals in the first frequency band and in the second frequency band to and from the radiating element. In other embodiments, the radiating element may be fed by first and second feed lines per polarization, where the first feed line is configured to pass RF signals in the first frequency band to and from the radiating element and the second feed line is configured to pass RF signals in the second frequency band to and from the radiating element.

In some embodiments, the first frequency band may be at least a portion of the 1.427-2.690 GHz frequency band and the second frequency band may be at least a portion of the 3.3-4.2 GHz frequency band. In other embodiments, the first frequency band may be the 1.695-2.690 GHz frequency band and the second frequency band may be at least a portion of the 3.3-4.2 GHz frequency band.

In some embodiments, a bandwidth of the first frequency band and a bandwidth of the second frequency band may each be at least 20% of the highest frequency in the second frequency band.

In some embodiments, a difference between the highest frequency in the second frequency band and the lowest frequency in the first frequency band may be at least 50% of the highest frequency in the second frequency band.

In some embodiments, each electromagnetic bandgap structure may comprise a plurality of unit cells.

In some embodiments, each reactively loaded transmission line may comprise an interdigitated finger capacitor and an inductor.

In some embodiments, the first through fourth dipole arms and the first through fourth electromagnetic bandgap structures may be formed on a printed circuit board. For example, the first through fourth dipole arms and at least a portion of the electromagnetic bandgap structures may be formed on a first surface of the printed circuit board. In some embodiments, the first through fourth electromagnetic bandgap structures may each include one or more conductive pads on a second surface of the printed circuit board that is opposite the first surface. In some embodiments, each of the conductive pads may be electrically floating.

Pursuant to further embodiments of the present invention, radiating elements are provided that comprise a first dipole radiator that includes a first dipole arm and a second dipole arm, a second dipole radiator that includes a third dipole arm and a fourth dipole arm, and first through fourth dipole arm extensions that are coupled to distal ends of the respective first through fourth dipole arms by respective first through fourth interdigitated capacitors.

In some embodiments the first through fourth interdigitated capacitors electrically connect the respective first through fourth dipole arms to the respective first through fourth dipole arm extensions.

In some embodiments, the radiating element may further comprise galvanic connections between the first through fourth dipole arm extensions and the respective first through fourth dipole arms.

In some embodiments, the radiating element may further comprise inductors interposed along at least some of the galvanic connections between the first through fourth dipole arm extensions and the respective first through fourth dipole arms.

In some embodiments, the first through fourth dipole arms, the first through fourth interdigitated capacitors and the first through fourth dipole arm extensions may each comprise respective metallization on a first surface of a printed circuit board. In some embodiments, the radiating element may further comprise first through fourth metallized regions on a second surface of a printed circuit board that overlap the first through fourth interdigitated capacitors, where each of the first through fourth metallized regions comprises one or more conductive pads. In some embodiments, the first through fourth metallized regions are electrically floating.

In some embodiments, the radiating element comprises a dual band radiating element that is configured to transmit and receive RF signals in both a first frequency band and in a second frequency band that comprises higher frequencies than the first frequency band. In some embodiments, the first dipole radiator is configured to transmit and receive signals in the second frequency band, and a combination of the first dipole radiator and the first and second electromagnetic bandgap structures are configured to transmit and receive signals in the first frequency band.

In some embodiments, the radiating element may be fed by a single feed line per polarization that is configured to pass RF signals in the first frequency band and in the second frequency band to and from the radiating element.

In some embodiments, a bandwidth of the first frequency band and a bandwidth of the second frequency band may each be at least 20% of the highest frequency in the second frequency band.

In some embodiments, a difference between the highest frequency in the second frequency band and the lowest frequency in the first frequency band may be at least 50% of the highest frequency in the second frequency band.

In some embodiments, the first though fourth interdigitated capacitors may be part of respective first through fourth reactively loaded transmission lines that couple the respective first through fourth dipole arms to the respective first through fourth dipole arm extensions.

Pursuant to further embodiments of the present invention, base station antennas are provided that comprise a reflector, a plurality of first radiating elements extending forwardly from the reflector, the first radiating elements defining a first column and configured to operate in a first operating frequency band but not in a second operating frequency band that encompasses lower frequencies than the first operating frequency band, and a plurality of second radiating elements extending forwardly from the reflector, the second radiating elements configured to operate in both the first operating frequency band and the second operating frequency band. Each second radiating elements includes at least one electromagnetic bandgap structure.

In some embodiments, each second radiating element comprises a first dipole radiator that includes a first dipole arm and a second dipole arm, a second dipole radiator that includes a third dipole arm and a fourth dipole arm, and the at least one electromagnetic bandgap structure included in each second radiating element may be first through fourth electromagnetic bandgap structures that are coupled to distal end portions of the respective first through fourth dipole arms.

In some embodiments, each second radiating element further comprises first through fourth dipole arm and first through fourth electromagnetic bandgap structures that are coupled to the respective first through fourth dipole arms, wherein each of the first through fourth electromagnetic bandgap structures comprises a reactively loaded transmission line and a dipole extension that is coupled to a distal end of the reactively loaded transmission line.

In some embodiments, the first dipole radiator may be configured to transmit and receive signals in the second operating frequency band, and a combination of the first dipole radiator and the first and second electromagnetic bandgap structures may be configured to transmit and receive signals in the first operating frequency band.

In some embodiments, a bandwidth of the first operating frequency band and a bandwidth of the second frequency band are each at least 20% of the highest frequency in the second operating frequency band, and the first and second operating frequency bands may be spaced apart by at least 10% of the highest frequency in the second operating frequency band.

In some embodiments, each electromagnetic bandgap structure may comprise an interdigitated finger capacitor and an inductor.

Pursuant to still further embodiments of the present invention, base station antennas are provided that comprise a reflector, a plurality of first radiating elements extending forwardly from the reflector, the first radiating elements arranged in a plurality of first columns and configured to operate in a first operating frequency band but not in a second operating frequency band, and a plurality of second radiating elements extending forwardly from the reflector, the second radiating elements arranged in a plurality of second columns, the second radiating elements configured to operate in both the first operating frequency band and the second operating frequency band. The first and second columns together define at least part of a first array that is configured to operate in the first operating frequency band, and the plurality of second columns define at least part of a second array that is configured to operate in the second operating frequency band.

In some embodiments, the second radiating elements may be larger than the first radiating elements.

In some embodiments, a number of first columns may be equal to a number of second columns. In some embodiments, the first and second columns may be arranged in an alternating manner. In some embodiments, the first columns may be vertically staggered with respect to the second columns.

In some embodiments, each second radiating element may comprise a first dipole radiator that includes a first dipole arm and a second dipole arm, a second dipole radiator that includes a third dipole arm and a fourth dipole arm, and the at least one electromagnetic bandgap structure included in each second radiating element may be first through fourth electromagnetic bandgap structures that are coupled to distal end portions of the respective first through fourth dipole arms.

In some embodiments, each of the first through fourth electromagnetic bandgap structures may comprise a reactively loaded transmission line and a dipole arm extension coupled to the reactively loaded transmission line.

In some embodiments, the first dipole radiator may be configured to transmit and receive signals in the first operating frequency band, and wherein a combination of the first dipole radiator and the first and second electromagnetic bandgap structures may be configured to transmit and receive signals in the second operating frequency band.

In some embodiments, a bandwidth of the first operating frequency band and a bandwidth of the second frequency band may each be at least 20% of the highest frequency in the second operating frequency band, and the first and second operating frequency bands may be spaced apart by at least 10% of the highest frequency in the second operating frequency band

Figure 1A:
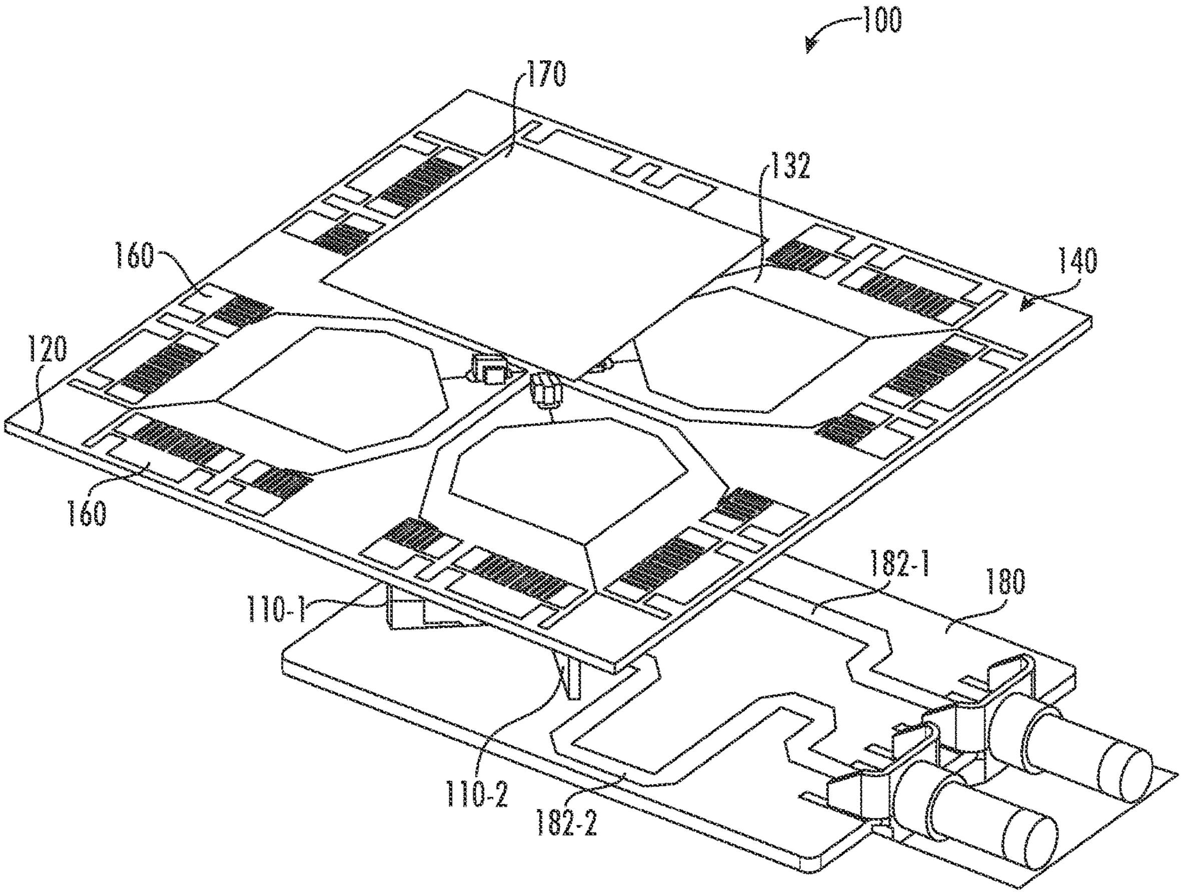
FIG. 1A is a front perspective view of a dual-band, dual-polarized radiating element according to embodiments of the present invention.

Herein, when multiple like elements are present they may be referred to using a two part reference number. Such elements may be referred to individually by their full reference numeral, and may be referred to collectively by the first part of their reference numeral (i.e., the part prior to the hyphen).

DETAILED DESCRIPTION

Demand for base station antennas that include a large number of radiating element arrays has increased significantly. In some applications, wireless operators require base station antennas that include a large number of linear arrays (e.g., six, eight, ten, twelve or more). In other applications, wireless operators require base station antennas that include multiple linear arrays as well as one or more multi-column beamforming antenna arrays. In many cases, cellular operators require at least one eight-column array in order to support massive multi-input-multi-output ("MIMO") communications. Unfortunately, fitting all of these antenna arrays within a single housing results in a very large base station antenna, which may result in problems with respect to wind loading, weight, zoning ordinances and the like.

Presently, radiating elements are designed to operate in a single, generally continuous band of frequencies. Some radiating elements may be relatively wideband, such as radiating elements that cover the 1.427-2.690 GHz frequency band or the 2.3-4.2 GHz frequency band. These frequency bands may include multiple sub-bands that support different types of cellular service. In some cases, an antenna may be designed so that each linear array of radiating elements will support service in only one of the sub-bands (e.g., the sub-band in which the radio that is coupled to the antenna transmits and receives signals). In other cases, diplexers may be included in the antenna, so that multiple radios may be coupled to each linear array so that the linear array may simultaneously support service in two or more of the sub-bands.

One potential way to decrease the size of a base station antenna while supporting service in a given number of frequency bands is to reduce the size of the radiating elements used to form one or more of the arrays. Another way to decrease the size of a base station antenna while supporting service in a given number of frequency bands is to share radiating elements across multiple frequency bands.

Pursuant to embodiments of the present invention, dual-band, dual-polarized radiating elements are provided that can support service in at least two wideband frequency bands. Since the radiating elements according to embodiments of the present invention can be used to transmit and receive RF signals in two different wideband frequency bands, the total number of radiating elements included in an antenna can be reduced significantly, allowing the overall size of the antenna to be reduced.

The radiating elements according to embodiments of the present invention may be implemented as dual-band, cross-dipole radiating elements. These radiating elements may include a pair of −/+45° dipole radiators that are configured to transmit and receive RF signals (having the respective −/+45° polarizations) in the higher of the two operating frequency bands. Each dipole radiator may include a pair of center-fed dipole arms via an electromagnetic bandgap structure. The electromagnetic bandgap structures may, for example, operate as stopband filters for RF energy in the higher operating frequency band, and thus currents generated in response to RF signals in the higher operating frequency band will primarily flow on the center-fed dipole arms. However, the electromagnetic bandgap structures will pass RF energy in the lower operating frequency band, and thus currents generated in response to RF signals in the lower operating frequency band will flow on both the center-fed dipole arms and on the electromagnetic bandgap structures. The electromagnetic bandgap structures may be sized so that each "extended" dipole arm (i.e., the combination of a dipole arm and the electromagnetic bandgap structure) is resonant in the lower operating frequency band.

In some embodiments, the radiating elements may include a total of two RF connections to a feed circuit, namely an RF connection for each of the two polarizations. The first RF connection may pass RF signals in both the first and second operating frequency bands between the first dipole radiator (e.g., the −45° dipole radiator) and the feed circuit, and the second RF connection may pass RF signals in both the first and second operating frequency bands between the second dipole radiator (e.g., the +45° dipole radiator) and the feed circuit. In other embodiments, four RF connections may be provided so that RF signals in the first and second operating frequency bands may be separately fed to the first and second dipole radiators of the radiating element.

In some embodiments, the first operating frequency band may be spaced apart from the second operating frequency band. For example, in some embodiments, the first operating frequency band may be the 1.427-2.690 GHz frequency band and the second operating frequency band may be the 3.3-4.2 GHz frequency band. These bands are separated by more than 600 MHZ. In other embodiments, the first operating frequency band may be the 1.695-2.690 GHz frequency band and the second operating frequency band may be the 3.3-4.2 GHz frequency band. In some embodiments, the bandwidth of the first frequency band (i.e., the difference between the highest and lowest frequencies in the first operating frequency band) and the bandwidth of the second frequency band may each be at least 20% of the highest frequency in the higher of the two operating frequency bands. In some embodiments, the difference between the highest frequency in the higher operating frequency band and the lowest frequency in the lower operating frequency band is at least 50% of the highest frequency in the higher operating frequency band.

In some embodiments, each electromagnetic bandgap structure may comprise a plurality of reactively loaded transmission lines and a dipole arm extension. Each reactively loaded transmission line may be loaded with at least one capacitance and at least one inductance. The capacitances may be series capacitances and the inductances may be shunt inductances in some embodiments. The reactively loaded transmission lines may connect the dipole arm to an associated dipole arm extension. The reactive components may be arranged so that the electromagnetic bandgap structure supports backward wave propagation (which is also referred to as "left-handed" propagation) such that the direction that the phase advances is antiparallel (i.e., in the opposite direction) from the direction of power flow. As a result, the electromagnetic bandgap structure may strongly suppress power transmission over a selected frequency range while allowing power transfer in other frequency ranges. Moreover, because the left-handed property of the electromagnetic bandgap structure allows the amount of phase shift per unit length to be engineered, the overall size of the dipole arm extension may be reduced significantly so that the dipole arms of the radiating elements according to embodiments of the present invention may be smaller than comparable conventional dipole arms that are designed to operate in the lower of the operating frequency bands.

In some embodiments, the capacitors of the electromagnetic bandgap structure may comprise interdigitated finger capacitors that are interposed between a distal portion of the dipole arms and their associated dipole arm extensions. The inductors may be implemented as narrow inductive traces. The dipole arms, the dipole arm extensions, the capacitors and the inductors may all be implemented, for example, on a first metal layer of a dipole radiator printed circuit board. Additional conductive pads may be provided on a second metal layer of the dipole radiator printed circuit board that overlap the respective dipole arm extensions and electromagnetic bandgap structure. These additional conductive pads may be electrically floating in some embodiments.

Pursuant to additional embodiments of the present invention, base station antennas are provided that include a reflector and respective columns of first and second radiating elements that extend forwardly from the reflector. The first radiating elements are configured to operate in a first operating frequency band but not in a second operating frequency band that encompasses lower frequencies than the first operating frequency band, and the second radiating elements are configured to operate in both the first and second operating frequency bands. At least some of the second radiating elements may be interspersed between some of the first radiating elements. Each second radiating element may comprise a first dipole radiator that includes a first dipole arm and a second dipole arm, a second dipole radiator that includes a third dipole arm and a fourth dipole arm, and first through fourth electromagnetic bandgap structures that are coupled to the respective first through fourth dipole arms.

Pursuant to further embodiments of the present invention, base station antennas are provided that include a multi-column array of radiating elements that supports operation in two different frequency bands. The multi-column array may include a plurality of columns of first radiating elements that are configured to operate in both first and second spaced-apart operating frequency bands. The multi-column array may further include a plurality of columns of second radiating elements that are configured to operate in the second frequency band. In some embodiments, the array includes the same number of columns of first radiating elements and columns of second radiating elements, and the columns of first radiating elements and columns of second radiating elements may be arranged in alternating fashion. The columns of first radiating elements may form the array that operates in the first operating frequency band, and all of the columns may form the array that operates in the second operating frequency band. Since half of the columns are shared by both arrays, the total number of columns of radiating elements required to implement the base station antenna is reduced.

Embodiments of the present invention will now be described in further detail with reference to the attached figures.

Figure 1B:
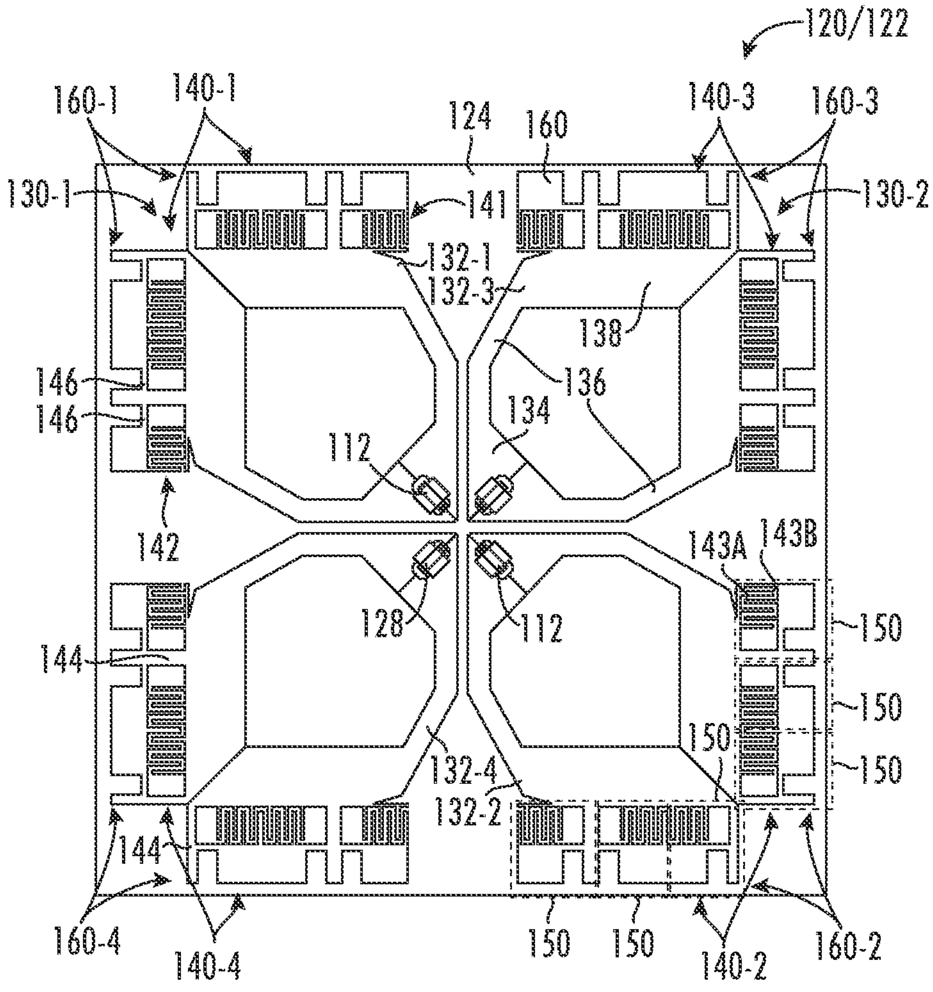
FIG. 1B is a front view of the radiating element of FIG. 1A.
Figure 1C:
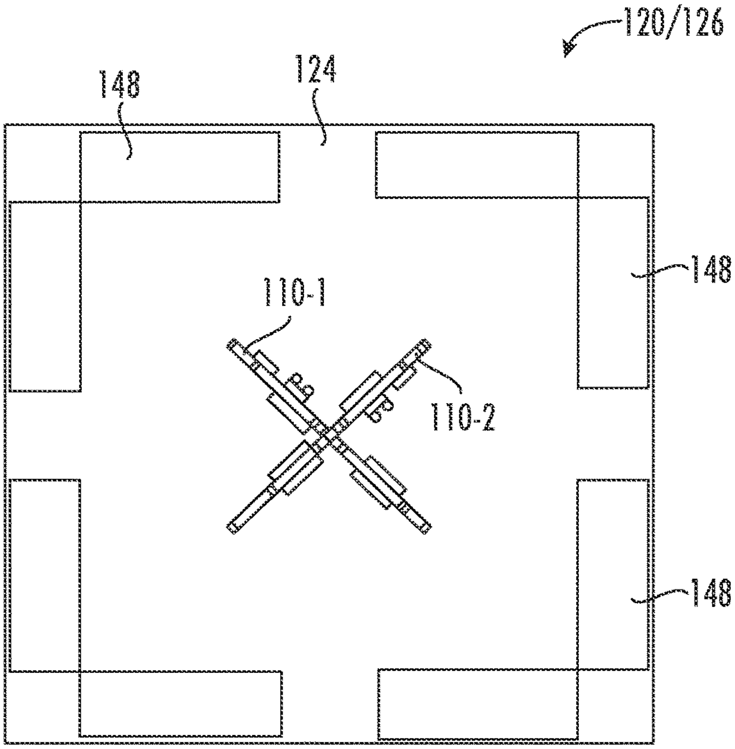
FIG. 1C is a back view of a dipole radiator printed circuit board of the radiating element of FIG. 1A.
Figure 1D:
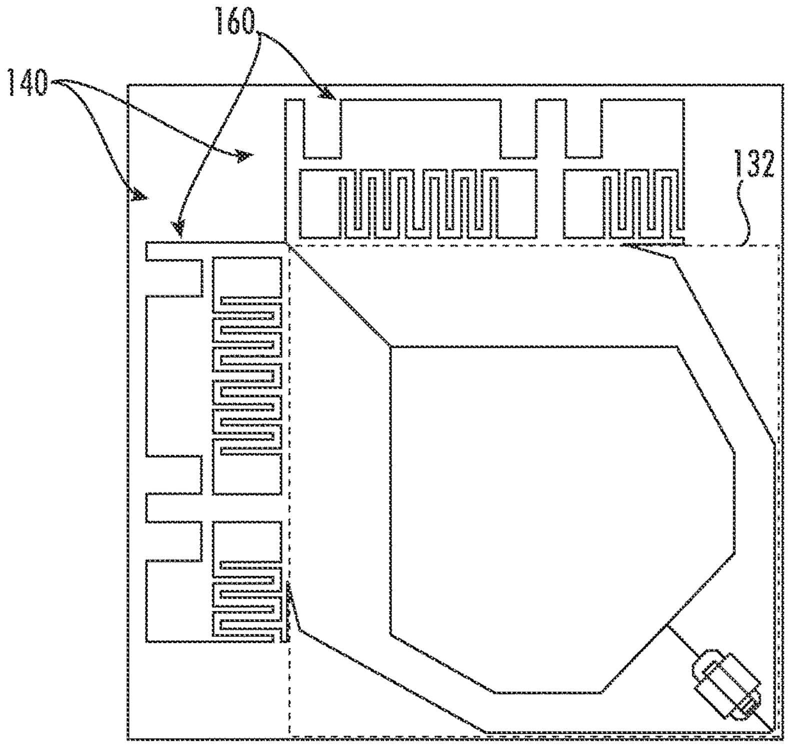
FIG. 1D is a partial front view of the radiating element of FIG. 1A that illustrates the portions of the dipole radiator printed circuit board that correspond to one of the higher frequency dipole arms and its corresponding electromagnetic bandgap structure.
Figure 1E:
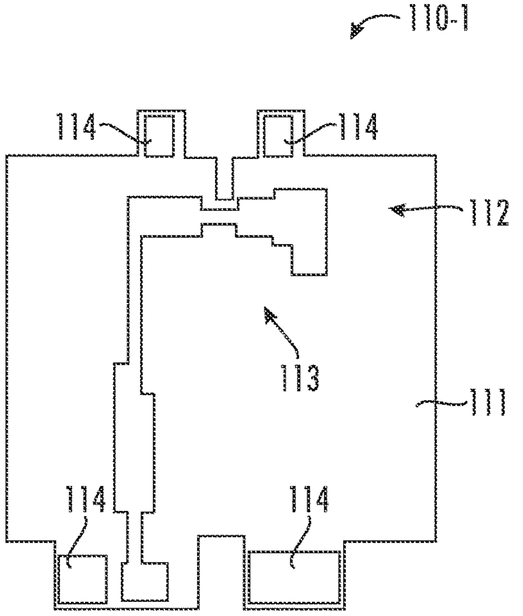
FIGS. 1E and 1F are plan views illustrating the respective sides of one of the feed stalk printed circuit boards included in the radiating element of FIGS. 1A-1D.
Figure 1F:
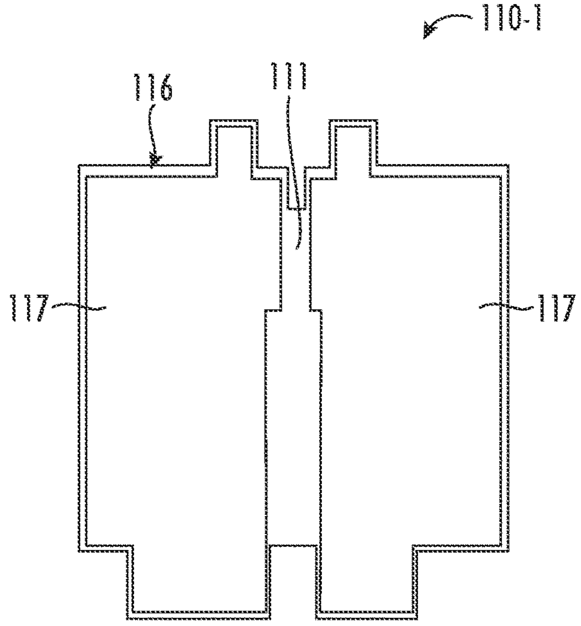

FIGS. 1A-1F illustrate a dual-band, dual-polarization radiating element 100 according to according to certain embodiments of the present invention. In particular, FIG. 1A is a front perspective view of the radiating element 100, while FIG. 1B is a front view of the radiating element 100. FIG. 1C is a back view of a dipole radiator printed circuit board of the radiating element 100. FIG. 1D is a partial front view of the radiating element 100 of FIG. 1A that illustrates the portions of the dipole radiator printed circuit board that correspond to one of the higher frequency dipole radiators and its corresponding electromagnetic bandgap structure. Finally, FIGS. 1E and 1F are plan views illustrating the respective sides of one of the feed stalk printed circuit boards included in the radiating element 100 of FIGS. 1A-1D.

As shown in FIG. 1A, the radiating element 100 includes a pair of feed stalks 110-1, 110-2, a dipole radiator printed circuit board 120 that may be mounted on the feed stalks 110, and a director 170 that may be mounted on the dipole radiator printed circuit board 120. The feed stalks 110-1, 110-2 may each be implemented using printed circuit boards that include central slots that allow the two feed stalks 110-1, 110-2 to be mounted in an "X" configuration as is well known in the art. The feed stalks 110-1, 110-2 may have almost identical designs (with the primary difference being that one includes a slot that extends from the front of the feed stalk toward the back, while the other includes a slot that extends from the back of the feed stalk toward the front). The design of feed stalk 110-1 is discussed in more detail below with reference to FIGS. 1E-1F. The radiating element 100 may be mounted on a feed board printed circuit board 180 of a base station antenna.

Referring to FIGS. 1B-1C, the dipole radiator printed circuit board 120 may be implemented as a so-called single layer printed circuit board that includes a dielectric substrate 124 having patterned metallization layers 122, 126 on either major surface thereof. Herein, metallization layer 122 may be referred to as the front metal layer and metallization layer 126 may be referred to as the rear metal layer.

As shown in FIG. 1B, front metal layer 122 includes a pair of dipole radiators 130-1, 130-2 and a plurality of electromagnetic bandgap structures 140. Forwardly extending tabs 112 on the feed stalks 110 are received within corresponding slits 128 in the dipole radiator printed circuit board 120 in order to mount the dipole radiator printed circuit board 120 on the feed stalks 110.

First dipole radiator 130-1 consists of first and second dipole arms 132-1, 132-2 which each extend at an angle of −45° when the radiating element 100 is mounted for use and hence transmit and receive RF energy having a −45° linear polarization. Second dipole radiator 130-2 consists of third and fourth dipole arms 132-3, 132-4 which each extend at an angle of +45° when the radiating element 100 is mounted for use and hence transmit and receive RF energy having a +45° linear polarization. Each dipole arm 132 may comprise metallization on the dielectric substrate 124 of dipole radiator printed circuit board 120, where the metallization is part of the front metallization layer 122. Each dipole arm 132 includes a base 134 that is located near the center of dipole radiator printed circuit board 120 and a distal end 138. A pair of arms 136 connect the base 134 of each dipole arm 132 to its distal end 138. While the center of each dipole arm 132 is open (i.e., no metallization is provided so that the dielectric substrate 124 is exposed), it will be appreciated that in other embodiments each dipole arm 132 may include additional metallization, such as mostly or completely filling in the open area in each dipole arm 132.

An electromagnetic bandgap structure 140 is provided adjacent the outer side of the distal end 138 of each dipole arm 132. An electromagnetic bandgap structure 140 refers to a structure that may be used to prevent the propagation of certain modes in certain frequency bands by employing periodically arranged resonant circuits. Transmission line metamaterial techniques may be used, for example, to implement electromagnetic bandgap structures 140, and may facilitate miniaturizing the size of each electromagnetic bandgap structure 140. Such transmission line metamaterial techniques may involve introducing reactive loading components such as capacitors, inductors and/or other resonant elements in series or shunt along a transmission line. These transmission line metamaterial techniques may allow one to engineer the phase shift per unit length with the potential to mimic the behavior of much longer unloaded transmission lines.

Each electromagnetic bandgap structure 140 may, in some embodiments, comprise one or more reactively loaded transmission lines 141 and a dipole arm extension 160. The reactively loaded transmission lines 141 are coupled between a dipole arm 132 and an associated dipole arm extension 160. The reactive loading of each reactively loaded transmission line 141 may comprise, for example, series capacitances and shunt inductances. The reactive components may be arranged so that the electromagnetic bandgap structure 140 supports backward wave propagation (which is also referred to as "left-handed" propagation) such that the direction that the phase advances is antiparallel (i.e., in the opposite direction) from the direction of power flow. As a result, the electromagnetic bandgap structure 140 may strongly suppress power transmission over a selected frequency range while allowing power transfer in other frequency ranges. Moreover, because the left-handed property of the electromagnetic bandgap structure allows the amount of phase shift per unit length to be engineered, the overall size of the dipole arm extension 160 may be reduced so that the dipole radiators 130 may be smaller than comparable conventional dipole radiators that are designed to operate in the lower of the operating frequency bands.

As shown best in FIGS. 1A and 1B, in an example embodiment, the reactive components may comprise series capacitors 142 and shunt inductances 146. The series capacitors 142 of each electromagnetic bandgap structure 140 may be implemented as interdigitated finger capacitors that are interposed between the distal portion 138 of each dipole arm 132 and the corresponding dipole arm extension 160. The series capacitors 142 may be formed by forming first comb structures 143A that extend outwardly from the distal end 138 of each dipole arm 132 and second comb structures 143B that extend inwardly from the dipole arm extensions 160. Teeth of the first and second comb structures 143A, 143B may be interleaved so (except at the ends) each tooth of the first comb structure 143A has teeth from the second comb structure 143B immediately adjacent on either side thereof, and so that each tooth of the second comb structure 143B has teeth from the first comb structure 143A immediately adjacent on either side thereof. Projections 144 that may act as transmission lines may extend from each dipole arm 132. Each projection 144 may be connected to one or more of the dipole arm extensions 160 via narrow traces that have high inductance and hence function as inductors 146. The dipole arms 132, the dipole arm extensions 160, the capacitors 142, the projections 144 and the inductors 146 may all be implemented, for example, on the front metallization layer 122 of dipole radiator printed circuit board 120.

Referring to FIG. 1C, the back metallization layer 126 of dipole radiator printed circuit board 120 is shown. As shown in FIG. 1C, conductive pads 148 are formed on the back metallization layer 126. The conductive pads 148 may be formed around the periphery of the dipole radiator printed circuit board 120, and may be directly behind the electromagnetic bandgap structures 140. Thus, the electromagnetic bandgap structures 140 may "overlap" the conductive pads 148. Herein, a structure on a first metallization layer of a printed circuit board "overlaps" a structure on a second metallization layer of a printed circuit board if an axis that is perpendicular to a dielectric substrate of the printed circuit board intersects both structures. The conductive pads 148 may be electrically floating.

Each electromagnetic bandgap structure 140 may comprise a periodic structure that includes multiple unit cells 150. In the depicted embodiment, each electromagnetic bandgap structure 140 includes six unit cells 150. In FIG. 1B, the six unit cells 150 associated with dipole arm 132-2 are shown in dashed boxes. As shown, the unit cells 150 need not all be oriented the same. Each unit cell 150 includes an interdigitated finger capacitor 142, a projection 144, an inductor 146, and a dipole arm extension 160.

The director 170 (FIG. 1A) may, when viewed from the front, be smaller than the combination of the four dipole arms 132 (i.e., the director 170 may have a smaller footprint than the combination of the four dipole arms 132). The director 170 may be designed to primarily act on RF energy in the higher frequency band.

FIGS. 1E and 1F illustrate one of the feed stalks 110. The feed stalks 110 may each be implemented as a printed circuit board that includes a first metallization layer 112 and a second metallization layer 116 that are formed on opposed major surfaces of a dielectric substrate 111. As shown in FIG. 1E, the first metallization layer 112 includes a hook balun 113 and a plurality of solder pads 114. A feed conductor of a transmission line (e.g., a coaxial cable) that feeds radiating element 100 may be soldered to a first of the solder pads 114 that is electrically connected to the hook balun 113. The remaining solder pads 114 may be provided for physically mounting the feed stalk 110 on a mounting substrate (such as, for example, a feed board printed circuit board 180) or for mounting the dipole radiator printed circuit board on the feed stalk 110.

As shown in FIG. 1F, the second metallization layer 116 may comprise a pair of metal pads 117 that together cover most of one major surface of the feed stalk printed circuit board 110. The metal pads 117 may be electrically connected to a ground potential.

Radiating element 100 includes a single multi-frequency band feed line on each feed stalk 110. As such, upstream diplexers may be provided within a base station antenna that includes radiating element 100 to combine RF signals in two different frequency bands that are fed to radiating element 100 for transmission, and to split (by frequency) RF signals in two different frequency bands that are received by radiating element 100 so that the signals may be passed to different radios. These diplexers may be implemented, for example, on the feed boards 180 for the radiating elements 100, on phase shifter assembly printed circuit boards, or in any other appropriate location. Herein, the term "diplexer" is used broadly herein to encompass devices that filter/combine signals across two or more frequency bands, and hence encompasses, for example, triplexers. It should be noted that the 1427-2690 MHz low-band frequency band and the 3.3-4.2 GHz mid-band frequency band are fairly widely separated in frequency, and hence relatively low cost, microstrip printed circuit board based diplexers may be used in some embodiments to implement the diplexers while still providing good isolation, return loss and insertion loss performance.

As described above, the radiating element 100 is a dual band radiating element that is configured to transmit and receive RF signals in first and second frequency bands, where the second frequency band comprises higher frequencies than the first frequency band. The radiating element 100 includes a first dipole radiator 130-1 that includes a first dipole arm 132-1 and a second dipole arm 132-2, a second dipole radiator 130-2 that includes a third dipole arm 132-3 and a fourth dipole arm 132-4, and first through fourth electromagnetic bandgap structures 140-1 through 140-4 that are coupled to distal end portions 138 of the respective first through fourth dipole arms 132-1 through 132-4. Each electromagnetic bandgap structure 140 includes at least one reactively loaded transmission line 141 and a dipole arm extension 160. The dipole arm extension 160 is coupled to the dipole arm 132 through the one or more reactively loaded transmission lines 141.

In some embodiments, the first dipole radiator 130-1 may be configured to transmit and receive signals in the second frequency band, and a combination of the first dipole radiator 130-1 and its associated electromagnetic bandgap structures 140-1, 140-2 may be configured to transmit and receive signals in the first frequency band.

In some embodiments, the first frequency band may be at least a portion of the 1.427-2.690 GHz frequency band and the second frequency band may be at least a portion of the 3.3-4.2 GHz frequency band. In other embodiments, the first frequency band may be the 1.695-2.690 GHz frequency band and the second frequency band may be at least a portion of the 3.3-4.2 GHz frequency band. In some embodiments, a bandwidth of the first frequency band and a bandwidth of the second frequency band may each be at least 20% of the highest frequency in the second frequency band. In some embodiments, a difference between the highest frequency in the second frequency band and the lowest frequency in the first frequency band may be at least 50% of the highest frequency in the second frequency band.

The radiating element 100 may comprise a first dipole radiator 130-1 that includes a first dipole arm 132-1 and a second dipole arm 132-2, a second dipole radiator 130-2 that includes a third dipole arm 132-3 and a fourth dipole arm 132-4 and first through fourth electromagnetic bandgap structures 140-1 through 140-4. Each electromagnetic bandgap structure 140 may comprise a dipole arm extension 160 that is coupled to a distal end 138 of a respective one of the first through fourth dipole arms 132-1 through 132-4 by one or more reactively loaded transmission lines.

Figure 2:
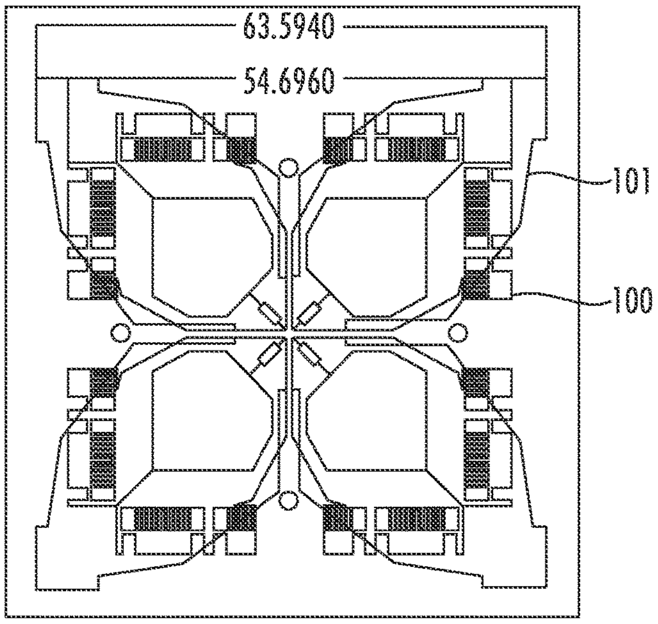
FIG. 2 is a front view of the radiating element of FIGS. 1A-1D overlaid over a conventional radiating element that operates in the 1.7-2.7 GHz frequency band to show the size difference between the two radiating elements.

FIG. 2 is a front view of radiating element 100 superimposed over a front view of a conventional cross-dipole radiating element 101 that is designed to operate in the 1695-2690 MHz frequency band. As can be seen, radiating element 100 is significantly smaller than radiating element 101. As discussed above, because the left-handed property of the electromagnetic bandgap structure 140 allows the amount of phase shift per unit length to be engineered, the overall size of the electromagnetic bandgap structure 140 may be reduced so that the dipole radiators 130 may be smaller than comparable conventional dipole radiators that are designed to operate in the lower of the operating frequency bands.

Figure 3A:
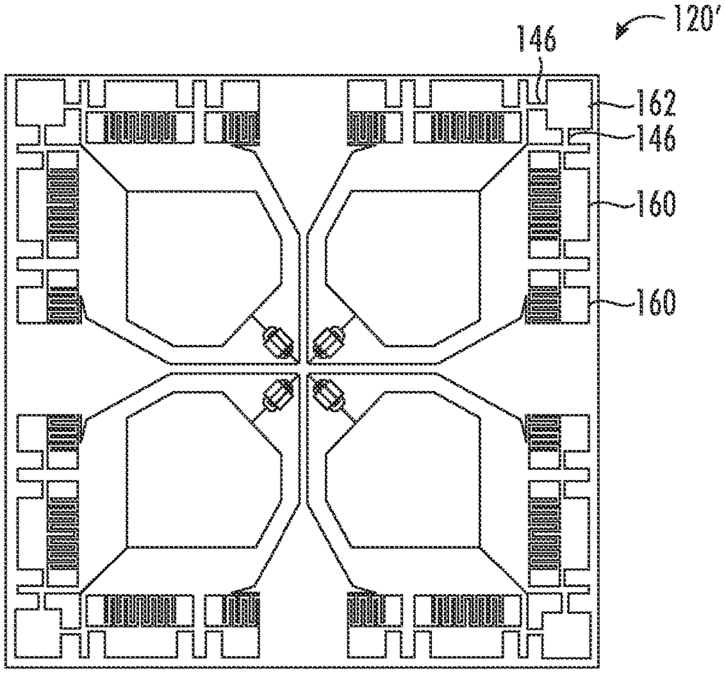
FIG. 3A is a front view of a dipole radiator printed circuit board that is a modified version of the dipole radiator printed circuit board included in the radiating element of FIGS. 1A-1D.

FIG. 3A is a front view of a dipole radiator printed circuit board 120' that is a modified version of the dipole radiator printed circuit board 120 of radiating element 100 of FIGS. 1A-1D. The dipole radiator printed circuit board 120' may be used in place of the dipole radiator printed circuit board 120 in the radiating element 100 that is discussed above. The discussion below will focus on the differences between dipole radiator printed circuit board 120' and dipole radiator printed circuit board 120. As shown in FIG. 3A, dipole radiator printed circuit board 120' is very similar to dipole radiator printed circuit board 120, but each dipole arm extension 160 further includes an additional pad 162 that is connected to two of the projections 144 by respective first and second inductive traces 146. As dipole radiator printed circuit board 120' may otherwise be identical to dipole radiator printed circuit board 120, further description thereof will be omitted.

Figure 3B:
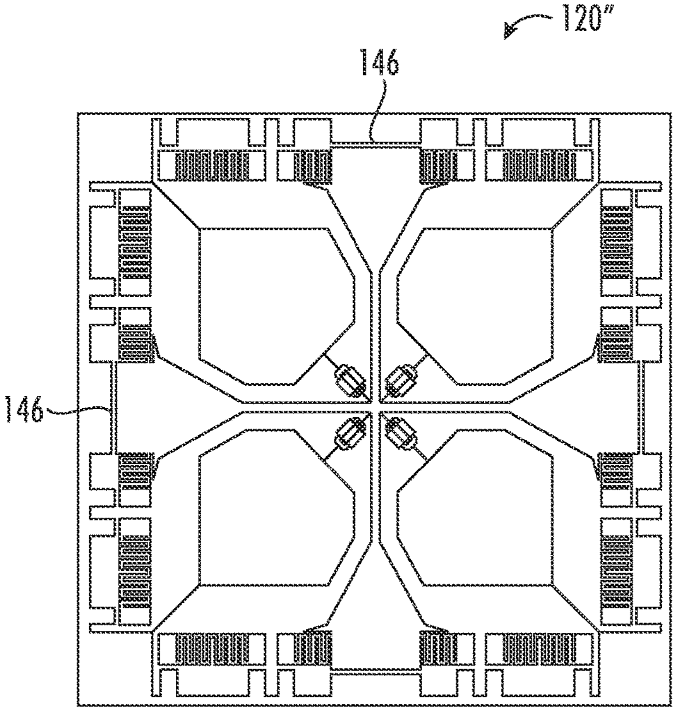
FIG. 3B is a front view of a dipole radiator printed circuit board that is another modified version of the dipole radiator printed circuit board included in the radiating element of FIGS. 1A-1D.

FIG. 3B is a front view of a dipole radiator printed circuit board 120" that is another modified version of the dipole radiator printed circuit board 120 of radiating element 100 of FIGS. 1A-1D. The dipole radiator printed circuit board 120" may be used in place of the dipole radiator printed circuit board 120 in the radiating element 100 that is discussed above. The discussion below will focus on the differences between dipole radiator printed circuit board 120" and dipole radiator printed circuit board 120.

As shown in FIG. 3B, the dipole radiator printed circuit board 120" may be identical to the dipole radiator printed circuit board 120, but may further include narrow inductive traces 146 that connect adjacent electromagnetic bandgap structures 140. The inclusion of these narrow inductive traces 146 may improve performance in some applications. As dipole radiator printed circuit board 120" may otherwise be identical to dipole radiator printed circuit board 120, further description thereof will be omitted.

Figure 3C:
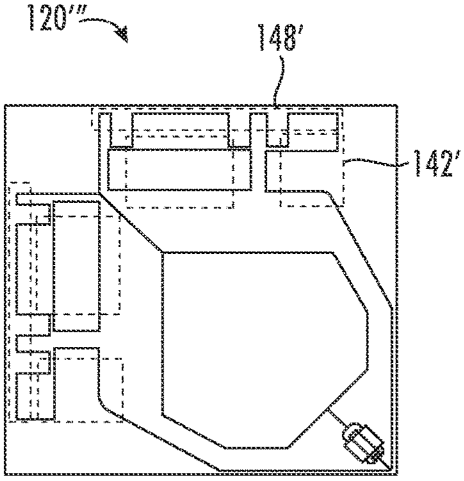
FIG. 3C is a partial front view of a dipole radiator printed circuit board that is another modified version of the dipole radiator printed circuit board included in the radiating element of FIGS. 1A-1D.

FIG. 3C is a partial front view of a dipole radiator printed circuit board 120''' that is another modified version of the dipole radiator printed circuit board 120 of radiating element 100 of FIGS. 1A-1D. As shown in FIG. 3C, the dipole radiator printed circuit board 120''' may be identical to the dipole radiator printed circuit board 120, except that the interdigitated finger capacitors 142 included in dipole radiator printed circuit board 120 are replaced in dipole radiator printed circuit board 120''' with plate capacitors 142'. In particular, plates shown by dashed boxes are formed on the rear side of dipole radiator printed circuit board 120''' that couple with both the distal end of the dipole arm 132 and with the dipole arm extension 160 in order to form a capacitive connection therebetween. The same plate capacitor design may be used on each dipole arm 132. The conductive pads 148' that are formed on the rear side of dipole radiator printed circuit board 120" may be reduced in size as compared to the corresponding pads 148 on dipole radiator printed circuit board 120, as is further shown in FIG. 3C. As dipole radiator printed circuit board 120''' may otherwise be identical to dipole radiator printed circuit board 120, further description thereof will be omitted.

Figure 4A:
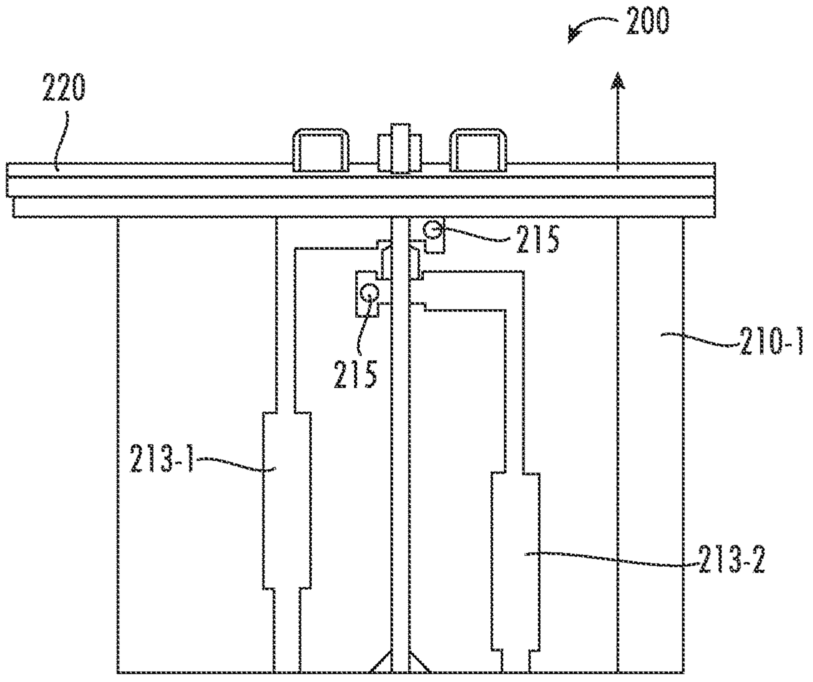
FIG. 4A is a side view of a dual-band, dual polarization radiating element according to further embodiments of the present invention.
Figure 4B:
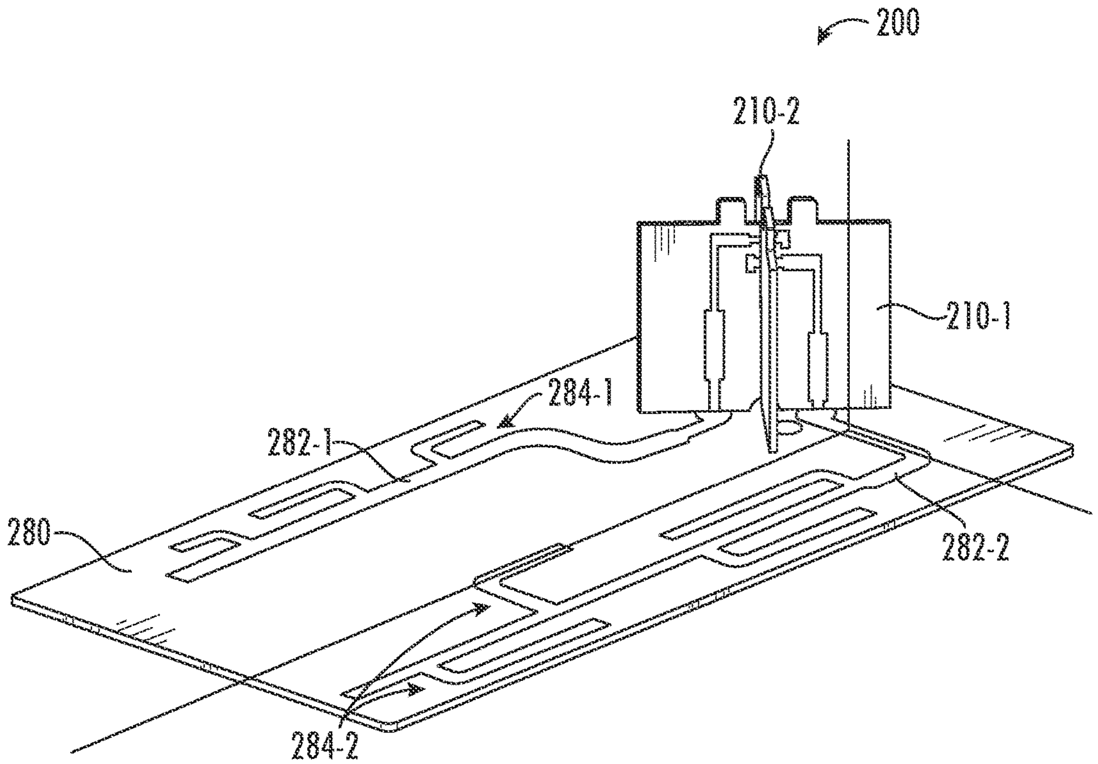
FIG. 4B is a front perspective view of the radiating element of FIG. 4A mounted on a feed board with the dipole radiator printed circuit board of the radiating element removed.

FIG. 4A is a side view of a dual-band, dual-polarized radiating element 200 according to further embodiments of the present invention. FIG. 4B is a front perspective view of the radiating element 200 of FIG. 4A mounted on a feed board 280 with the dipole radiator printed circuit board 220 of the radiating element 200 removed.

Radiating element 200 may be very similar to radiating element 100 of FIGS. 1A-1F, with the primary difference being that radiating element 200 includes a pair of single frequency band feed lines on each feed stalk 210, whereas radiating element 100 includes a single multi-frequency band feed line on each feed stalk 110. As discussed above, since radiating element 100 includes a multi-frequency band feed line, upstream diplexers may be provided within a base station antenna that includes radiating element 100.

As shown in FIG. 4A, each feed stalk 210 of radiating element 200 may include a pair of feed lines 213-1, 213-2. Feed lines 213-1, 213-2 are not implemented as hook baluns as was the case with the feed lines 113 in radiating element 100, but instead each comprise L-shaped feed lines that have a distal end that is shorted to a ground pad (which may be similar or identical to one of the ground pads 117 on feed stalk 110) that is on the reverse side of the feed stalk 213 via a plated through hole 215. Feed line 213-1 may, for example, be used to pass RF signals in the first frequency band between the feed stalk 210 and the dipole radiator printed circuit board 220, while feed line 213-2 may, for example, be used to pass RF signals in the second frequency band between the feed stalk 210 and the dipole radiator printed circuit board 220. In the depicted embodiment, feed line 213-1 is for the RF signals in the second (higher) operating frequency band, and feed line 213-2 is for the RF signals in the first (lower) operating frequency band.

As shown in FIG. 4B, a pair of filters 284-1, 284-2 may be formed on the feed board 280. In particular, a feed line 282-1 for the second (higher) operating frequency band signals on feed board 280 may include a notch filter 284-1 that substantially does not pass RF signals in the first operating frequency band. The notch filter 284-1 may comprise, for example, a plurality of open-circuit stubs. Similarly, a feed line 282-2 for the first (lower) operating frequency band signals on feed board 280 may include a notch filter 284-2 that substantially does not pass RF signals in the second operating frequency band. The notch filter 284-2 may also comprise, for example, a plurality of open-circuit stubs.

Figure 5A:
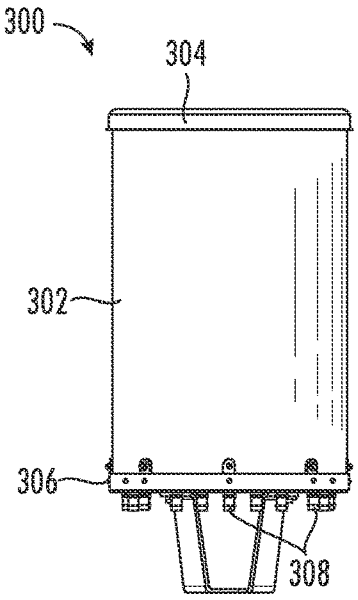
FIG. 5A (PRIOR ART)
FIG. 5A is a perspective view of a conventional omnidirectional small cell antenna.

FIG. 5A is a schematic perspective view of a conventional omnidirectional small cell antenna 300. The antenna 300 includes a cylindrical radome 302, a top end cap 304 and a bottom end cap 306. A plurality of RF ports 308 extend through the bottom end cap 306.

Figure 5B:
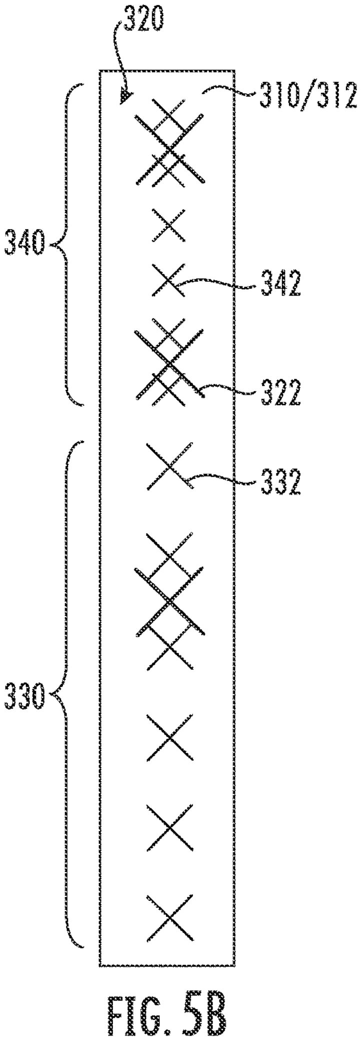
FIG. 5B (PRIOR ART)
FIG. 5B is a schematic front view of one of the four faces of a tubular reflector assembly that is included in the conventional base station antenna of FIG. 5A.

While not visible in FIG. 5A, base station antenna 300 includes a tubular reflector assembly 310 that is mounted within the interior of the radome 302. The reflector assembly 310 includes four faces 312 and has a square horizontal cross section. Each face 312 of reflector assembly 310 may be identical. FIG. 5B is a schematic front view of one of the four faces 312 of the tubular reflector assembly 310 that is included in antenna 300.

Referring to FIG. 5B, three linear arrays 320, 330, 340 are mounted on each face 312 of the tubular reflector assembly 310. The three linear arrays 320, 330, 340 may extend along a common vertical axis in an interleaved fashion. The three linear arrays comprise a low-band linear array 320 that includes three low-band radiating elements 322 that are configured to transmit and receive signals in all or part of the 617-960 MHz frequency band, a mid-band linear array 330 that includes six mid-band radiating elements 332 that are configured to transmit and receive signals in all or part of the 1695-2690 MHz frequency band, and a high-band linear array 340 that includes six high-band radiating elements 342 that are configured to transmit and receive signals in all or part of the 3.3-4.2 GHz frequency band. The high-band linear array 340 is stacked above the mid-band linear array 330, and the low-band linear array 320 is interleaved with both the mid-band linear array 330 and the high-band linear array 340.

Figure 5C:
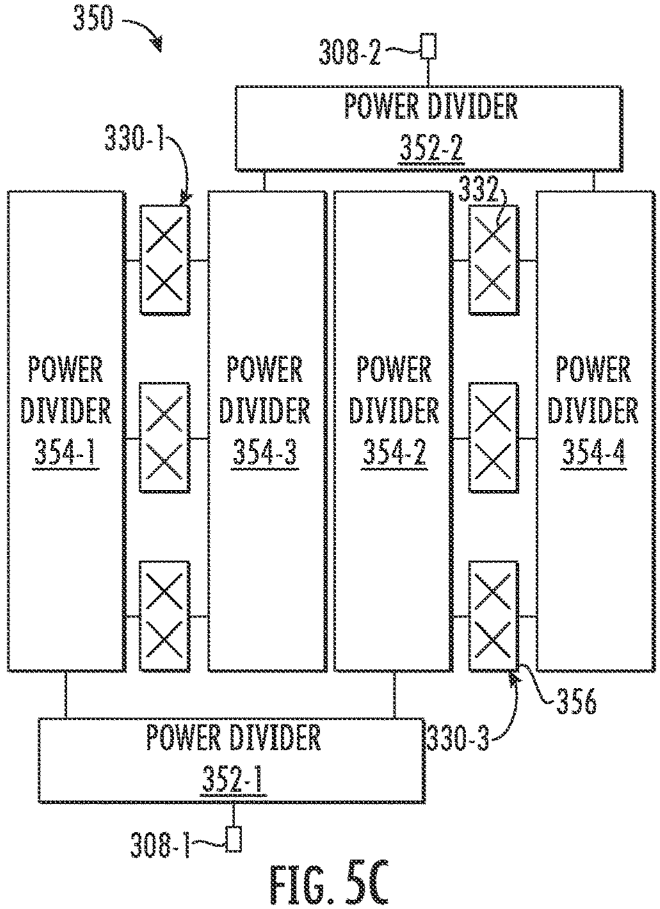
FIG. 5C (PRIOR ART)
FIG. 5C is a block diagram of the feed network for two of the linear arrays that are mounted on the first and third faces of the tubular reflector assembly of the conventional base station antenna of FIG. 5A.

FIG. 5C illustrates the feed network 350 for the two mid-band linear arrays 330-1, 330-3 that are mounted on the first and third faces of the tubular reflector assembly 310. As shown in FIG. 5C, a first of the RF ports 308-1, which may be connected to a mid-band radio (not shown), is coupled to a first-level power divider 352-1. The first-level power divider 352-1 splits RF signals received from RF port 308-1 into two subcomponents that are fed to a pair of second level power dividers 354-1, 354-2, that further split the RF signals fed thereto into three sub-components. Each output of the second-level power dividers 354-1, 354-2 is fed to a respective feed board 356, and each feed board 356 includes a pair of mid-band radiating elements 332 mounted thereon. Feed board power dividers (not shown) are provided on each feed board 356 that further split the RF signals fed thereto into two sub-components that are fed to the respective radiating elements 332 mounted on each feed board 356. Thus, the first-level power divider 352-1, the second level-power dividers 354-1, 354-2 and the feed board power dividers split RF signals from RF port 308-1 into twelve sub-components that are fed to the twelve mid-band radiating elements 332 included in mid-band linear arrays 330-1, 330-3. Since mid-band linear arrays 330-1, 330-3 point in opposite directions and are coupled to the same RF port 308-1, the two mid-band linear arrays 330-1, 330-3 will generate a first polarization antenna beam that has a peanut shape in the azimuth plane. As is further shown in FIG. 5C, a second RF port 308-2 (that is used to generate a second polarization antenna beam) is coupled to mid-band linear arrays 330-1, 330-3 in the exact same fashion, except that the first RF port 308-1 is coupled to the first polarization radiators of each radiating element 332, while the second RF port 308-2 is coupled to the second polarization radiators of each radiating element 332.

The feed network for mid-band linear arrays 330-2, 330-4 may be identical to the feed network 350 of FIG. 5C, except that the mid-band linear arrays 330-2, 330-4 are coupled to two additional RF ports 308-3, 308-4 rather than RF ports 308-1, 308-2. Thus, the four mid-band linear arrays 330-1 through 330-4 included in base station antenna 300 may simultaneously generate two antenna beams per polarization, where each antenna beam has a peanut shape in the azimuth plane, and the two antenna beams at each polarization are rotated by 90° with respect to each other in the azimuth plane. The feed networks for the high-band linear arrays 340-1 through 340-4 have the exact same design as shown in FIG. 5C, except that they connect four additional RF ports 308-5 through 308-8 to the four high-band linear arrays 340-1 through 340-4.

Base station antenna 300 may provide adequate performance. However, some wireless operators would prefer that antenna 300 include an additional high-band linear array per face 312 of the tubular reflector assembly 310, and would also prefer that one of the high-band linear arrays 340 per reflector panel 312 have a higher gain (which is achieved by including more radiating elements 342 in the linear array 340). Additionally, base station antenna 300 does not include remote electronic downtilt capabilities with respect to either the mid-band linear arrays 330 or the high-band linear arrays 340 because the mechanical linkage would need to drive a large number of phase shifters, and it is difficult to design a sufficiently robust mechanical linkage that will fit within the small volume of base station antenna 300.

Figure 6A:
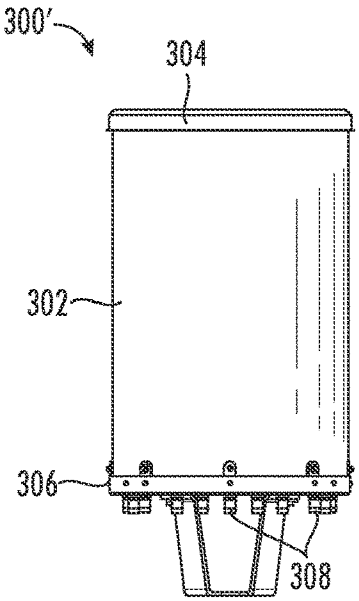
FIG. 6A is a perspective view of a small cell base station antenna according to embodiments of the present invention.
Figure 6B:
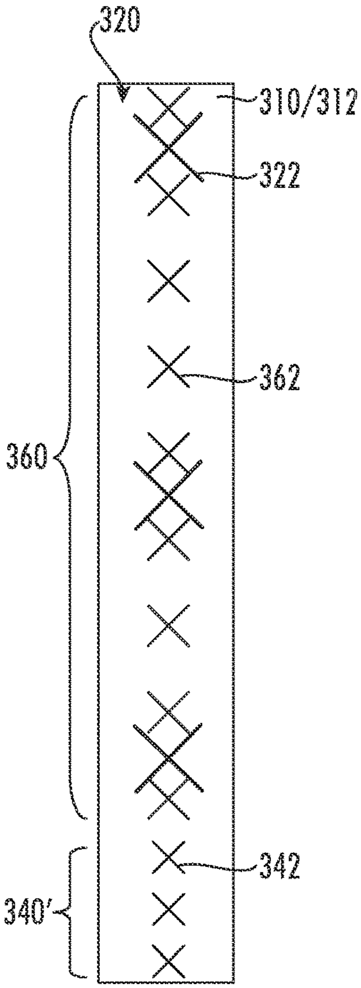
FIG. 6B is a schematic front view of one of the four faces of the tubular reflector assembly that is included in the base station antenna of FIG. 6A.
Figure 6C:
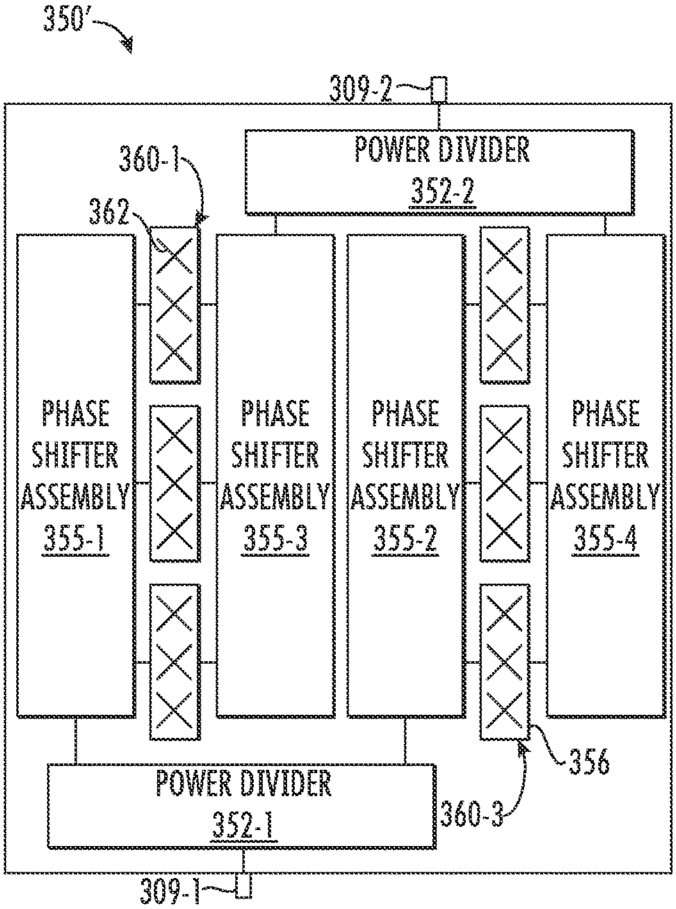
FIG. 6C is a block diagram of the feed network for the multi-band linear arrays that are mounted on the first and third faces of the tubular reflector assembly of the base station antenna of FIG. 6A.

FIGS. 6A-6C are various views of a small cell base station antenna 300' that is a modified version of base station antenna 300 of FIGS. 5A-5C that is implemented using the multi-band radiating elements according to embodiments of the present invention. In particular, FIG. 6A is a schematic perspective view of small cell base station antenna 300', FIG. 6B is a schematic front view of one of the four faces 312 of the tubular reflector assembly 310 that is included in antenna 300', and FIG. 6C is a block diagram of the feed network 350' for multi-band linear arrays 360-1, 360-3 that are mounted on the first and third faces of the tubular reflector assembly 310.

Referring to FIG. 6A, the base station antenna 300' may be substantially the same size as base station 300 and may appear identical from outside the antenna except for that base station 300' includes four additional RF ports 308 to support the additional high-band linear arrays, and may also include one or more control ports for enabling remote electronic tilt capabilities.

As shown in FIG. 6B, each of the four faces 312 of the tubular reflector assembly 310 in base station antenna 300' includes three linear arrays 320, 340', 360 that are mounted along a common vertical axis. The three linear arrays comprise a low-band linear array 320 that includes three low-band radiating elements 322 that are configured to transmit and receive signals in all or part of the 617-960 MHz frequency band, a high-band linear array 340' that includes three high-band radiating elements 342 that are configured to transmit and receive signals in all or part of the 1695-2690 MHz frequency band, and a multi-band linear array 360 that includes nine multi-band radiating elements 362 that are configured to transmit and receive signals in all or part of both the 1695-2690 MHz frequency band and the 3.3-4.2 GHz frequency band. The multi-band linear array 360 is stacked above the high-band linear array 340', and the low-band linear array 320 is interleaved with both the multi-band linear array 360 and the high-band linear array 340'.

FIG. 6C illustrates the feed network 350' for the multi-band linear arrays 360-1, 360-3 that are mounted on the first and third faces 312 of the tubular reflector assembly 310. As shown in FIG. 6C, the feed network 350' includes first and second inputs 309-1, 309-2, namely one for each polarization. Each input 309-1, 309-2 may be connected to a first RF port 308 that is connected to a mid-band radio port and to a second RF port 308 that is connected to a high-band radio port so that both mid-band and high-band RF signals may be fed to the multi-band linear arrays 360-1, 360-3. Input 309-1 is coupled to a first-level power divider 352-1. The first-level power divider 352-1 splits RF signals received at input 309-1 into two subcomponents that are fed to a pair of phase shifter assemblies 355-1, 355-2. Each phase shifter assembly 355 further splits the RF signals fed thereto into three sub-components, and then applies an adjustable phase progression to these sub-components in order to apply an electronic downtilt to the antenna beam generated by multi-band linear arrays 360-1, 360-3. Each output of the phase shifter assemblies 355-1, 355-2 is fed to a respective feed board 356, and each feed board 356 includes three multi-band radiating elements 362 mounted thereon. Feed board power dividers (not shown) are provided on each feed board 356 that further split the RF signals fed thereto into three sub-components that are fed to the respective radiating elements 362 mounted on each feed board 356. Thus, the first-level power divider 352-1, the phase shifter assemblies 355-1, 355-2 (which each include integrated power dividers, as is known in the art) and the feed board power dividers split RF signals from RF port 308-1 into eighteen sub-components that are fed to the eighteen multi-band radiating elements 362 included in multi-band linear arrays 360-1, 360-3 in order to generate both a mid-band first polarization antenna beam that has a peanut shape in the azimuth plane and a high-band first polarization antenna beam that has a peanut shape in the azimuth plane. As is further shown in FIG. 6C, the second input 309-2 (that is used to generate a second polarization antenna beam) is coupled to multi-band linear arrays 360-1, 360-3 in the exact same fashion to the second polarization radiators of each radiating element 362.

Figure 7:
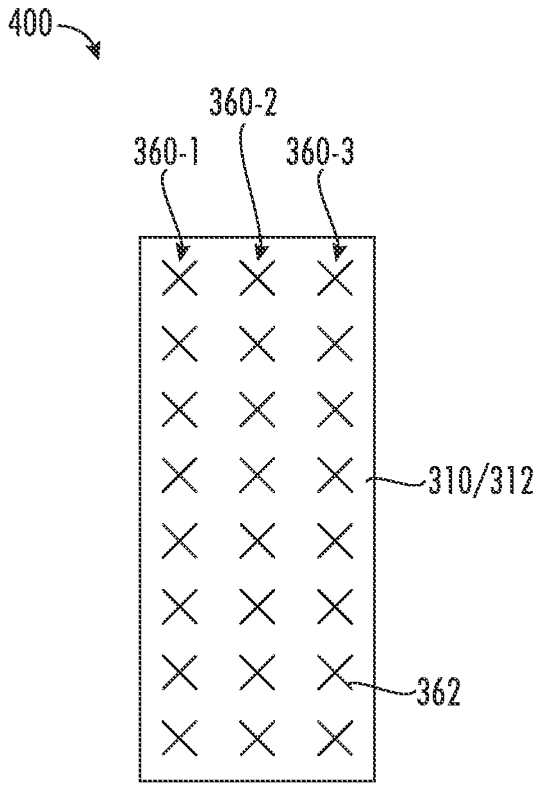
FIG. 7 is a schematic front view of one of the four faces of a tubular reflector assembly of another small cell base station antenna according to embodiments of the present invention.

FIG. 7 is a schematic front view of one of the four faces 312 of a tubular reflector assembly 310 of another small cell base station antenna 400 according to embodiments of the present invention. Base station antenna 400 is similar to base station antenna 300' in that it is an omnidirectional antenna that is configured to generate peanut shaped antenna beams in the azimuth plane. Base station antenna 400 primarily differs from base station 300' in terms of the types and layouts of the linear arrays mounted on each face 312 of the reflector assembly 310 (where all four faces 312 have the same configuration).

As shown in FIG. 7, three multi-band linear arrays 360 are provided on each face 312 of the reflector assembly, where in the example shown each multi-band linear array 360 includes eight multi-band radiating elements 362. The three multi-band linear arrays 360-1, 360-2, 360-3 illustrated, in combination with the additional three multi-band linear arrays 360 that are provided on the third (opposed) face 312 of the reflector assembly 310 may together generate three mid-band antenna beams at each polarization that each have a peanut shape in the azimuth plane and three high-band antenna beams at each polarization that each have a peanut shape in the azimuth plane. The three multi-band linear arrays 360 on the second and fourth (opposed) faces 312 of the reflector assembly 310 may together generate an additional three mid-band antenna beams at each polarization that each have a peanut shape in the azimuth plane and three high-band antenna beams at each polarization that each have a peanut shape in the azimuth plane.

Thus as described above with reference to FIGS. 6A-6C and 7, pursuant to some embodiments of the present invention, base station antennas 300', 400 are provided that comprise a reflector 310, a plurality of first radiating elements 342 extending forwardly from the reflector 310, the first radiating elements 342 defining a first column and configured to operate in a first operating frequency band but not in a second operating frequency band that encompasses lower frequencies than the first operating frequency band, and a plurality of second radiating elements 362 extending forwardly from the reflector 310, the second radiating elements 362 configured to operate in both the first operating frequency band and the second operating frequency band. Each second radiating element 362 includes at least one electromagnetic bandgap structure 140.

In some embodiments, each second radiating element 362 may comprise a first dipole radiator 130-1 that includes a first dipole arm 132-1 and a second dipole arm 132-2, a second dipole radiator 130-2 that includes a third dipole arm 132-3 and a fourth dipole arm 132-4, and the at least one electromagnetic bandgap structure 140 included in each second radiating element 362 may be first through fourth electromagnetic bandgap structures 140-1 through 140-4 that are coupled to distal end portions 138 of the respective first through fourth dipole arms 132-1 through 132-4. In some embodiments, each electromagnetic bandgap structure 140 comprises one or more reactively loaded transmission lines 141 and a dipole arm extension 160 that is coupled to its associated dipole arm 132 through the one or more reactively loaded transmission lines 141.

Cellular operators are deploying an increasing number of base station antennas that include multi-column beamforming arrays in order to support 5G cellular service. Many cellular operators are deploying base station antennas that include multi-column beamforming arrays that operate in the 2.3-2.69 GHz frequency band (herein "the T-band") or a portion thereof as well as multi-column beamforming arrays that operate in the 3.3-4.2 GHz frequency band (herein "the S-band") or a portion thereof. Typically, these beamforming arrays include four columns of radiating elements each, although more columns may be used (e.g., eight, sixteen or even thirty-two columns of radiating elements).

It may be challenging to include both a T-band and an S-band beamforming array in a single base station antenna while also meeting cellular operator requirements on the maximum width and length of the base station antenna. While these requirements may differ based on cellular operator, jurisdiction, and location where the antenna will be deployed, there are many situations where the width of the base station antenna must be no more than 498 mm or no more than 430 mm, and there are also situations where the length of the antenna must be 1500 mm or less. In addition, in some situations, the base station antenna must also include linear arrays of low-band radiating elements that operate in part or all of the 617-960 MHz frequency band and/or linear arrays of mid-band radiating elements that operate in part or all of the 1427-2690 MHz frequency band.

The multi-band radiating elements according to embodiments of the present invention may facilitate implementing two beamforming arrays in substantially less space.

Figure 8A:
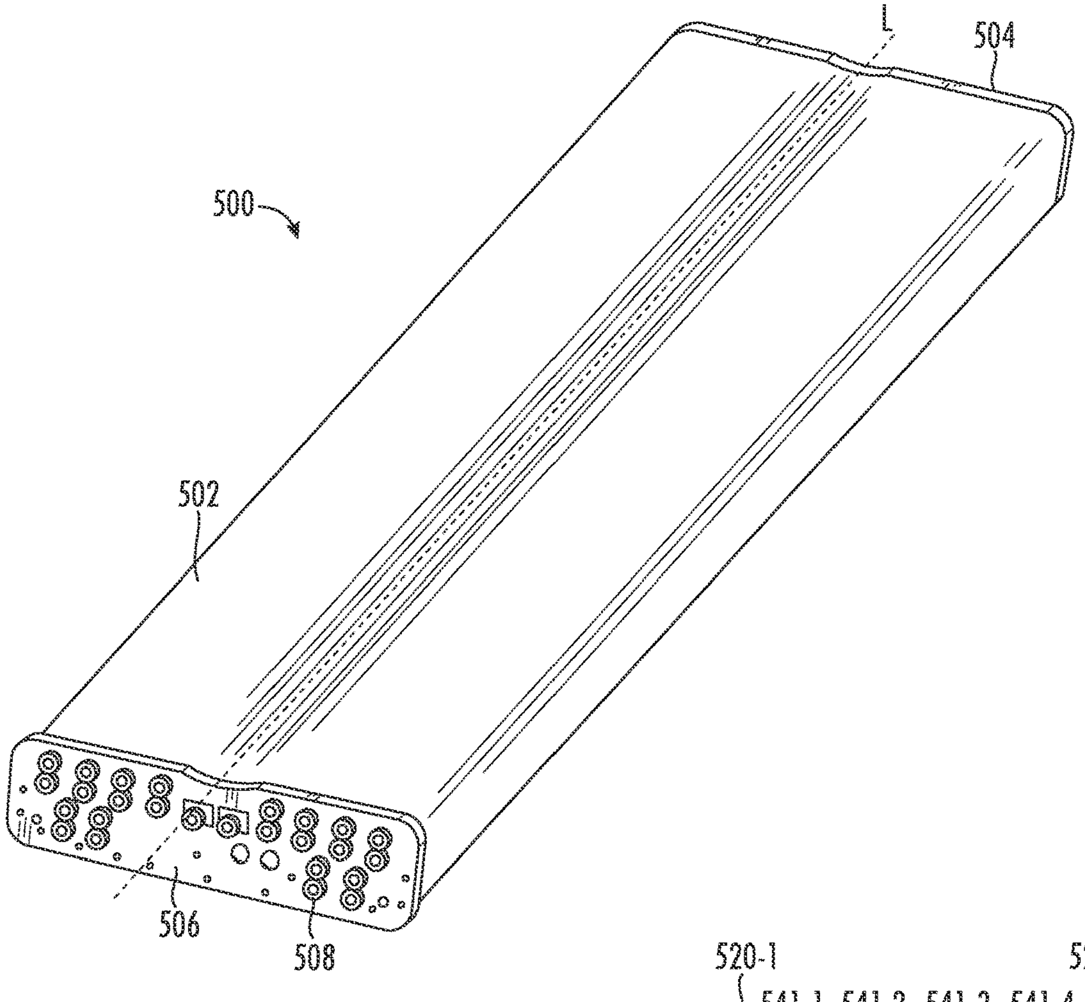
FIG. 8A is a front view of a base station antenna according to still further embodiments of the present invention.
Figure 8B:
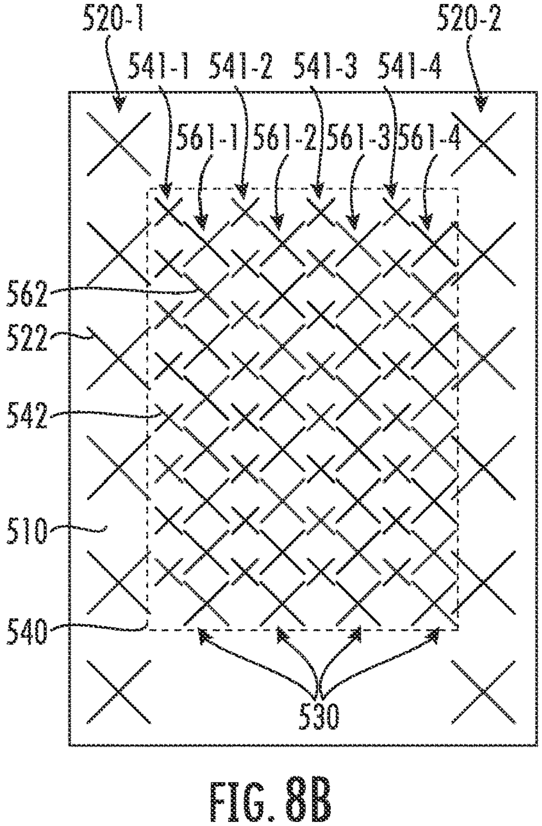
FIG. 8B is a schematic front view of the base station antenna of FIG. 5A with the radome removed.

FIG. 8A is a perspective view of a base station antenna 500 according to certain embodiments of the present invention. FIG. 8B is a schematic front view of the base station antenna 500 of FIG. 8A with the radome thereof removed.

As shown in FIG. 8A, the base station antenna 500 is an elongated structure that extends along a longitudinal axis L. The base station antenna 500 may have a tubular shape with a generally rectangular cross-section. The antenna 500 includes a radome 502 and a top end cap 504. One or more mounting brackets (not shown) may be provided on the rear side of the antenna 500 which may be used to mount the antenna 500 onto an antenna mount (not shown) on, for example, an antenna tower. The antenna 500 also includes a bottom end cap 506 which includes a plurality of RF connector ports 508 mounted therein. The RF connector ports 508 may be connected to corresponding ports of one or more radios via cabling connections (not shown). The antenna 500 is typically mounted in a vertical configuration (i.e., the longitudinal axis L may be generally perpendicular to a plane defined by the horizon) when the antenna 500 is mounted for normal operation. The radome 502, top cap 504 and bottom cap 506 may form an external housing for the antenna 500. An antenna assembly (FIG. 8B) is contained within the housing. The antenna assembly may be slidably inserted into the radome 502, typically from the bottom before the bottom cap 506 is attached to the radome 502.

As shown in FIG. 8B, the antenna assembly includes a reflector 510. The reflector 510 may comprise a metallic sheet that serves as a ground plane for the radiating elements (discussed below) that are mounted thereon, and also acts to redirect forwardly much of the backwardly-directed radiation emitted by these radiating elements. As is also shown in FIG. 8B, base station antenna 500 includes two low-band linear arrays 520-1, 520-2 of low-band radiating elements 522. Each low-band radiating element 522 is mounted to extend forwardly from the reflector 510, and may be configured to transmit and receive RF signals in the 617-960 MHz frequency band or a portion thereof.

The base station antenna 500 further includes four columns 561-1 through 561-4 of multi-band radiating elements 562 and four columns 541-1 through 541-4 of high-band radiating elements 542 that are disposed in alternating fashion The columns 561 are staggered with respect to the columns 541 in the vertical direction in order to reduce coupling between radiating elements 542, 562 in adjacent columns 541, 561.

Columns 561-1 through 561-4 of multi-band radiating elements 562 may form a four column T-band beamforming array 530. Each column 561-1 through 561-4 may be fed first and second polarization T-band RF signals. The combination of columns 561-1 through 561-4 and columns 541-1 through 541-4 may form an eight column S-band beamforming array 540. The spacing between columns 541, 561 may be a compromise of the ideal spacing for T-band and S-band. Likewise, the spacing between adjacent radiating elements 542, 562 in each column 541, 561 may also be a compromise of the ideal spacing for T-band and S-band.

As discussed above, when radiating elements are shared between two beamforming arrays that operate in different frequency bands, compromises may be necessary in the spacing between columns of the arrays and/or in the spacings between radiating elements in each column. These compromises may degrade performance parameters of the antenna beams generated in one or both bands, such as sidelobe levels, grating lobes, azimuth beamwidth, sector power ratio, cross-polarization discrimination, isolation and the like. PCT Application No. US/21/58205, filed Nov. 5, 2021, discloses a variety of base station antennas that include multiband, multi-column beamforming arrays that each have a plurality of distinct multi-column sub-arrays, where only some of the sub-arrays are shared between the multiple beamforming arrays. As discussed in PCT Application No. US/21/58205, the radiating element spacing in the sub-arrays that are not shared may be optimized for the frequency band of a single beamforming array, which may improve performance as compared to beamforming arrays in which all of the radiating elements are shared.

Figure 9:
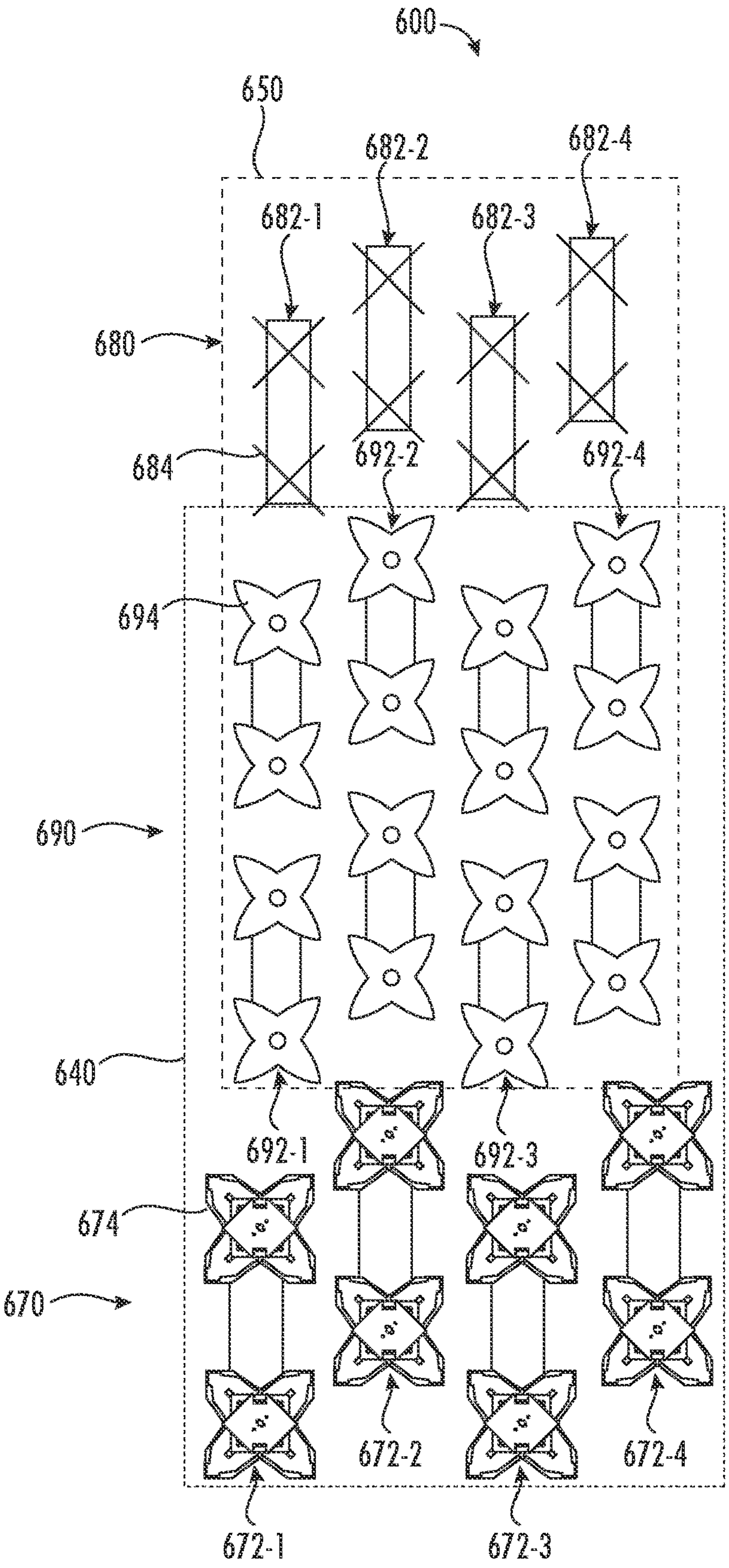
FIG. 9 is a schematic front view of a portion of a base station antenna according to further embodiments of the present invention.

For example, in some embodiments, PCT Application No. US/21/58205 discloses base station antennas that include multiband, multi-column beamforming arrays that each have at least three distinct multi-column sub-arrays. FIG. 9 is a schematic front view of a portion of one such base station antenna 600 that is disclosed in PCT Application No. US/21/58205. As shown in FIG. 9, base station antenna 600 includes a first sub-array 670 that include a plurality of columns 672-1 through 672-4 of first radiating elements 674 that are configured to operate in a first frequency band, a second sub-array 680 that includes a plurality of columns 682-1 through 682-4 of second radiating elements 684 that are configured to operate in a second frequency band that is different than the first frequency band, and a third sub-array 690 that includes a plurality of columns 692-1 through 692-4 of third radiating elements 694 that are configured to operate in both the first and second frequency bands. The first and third sub-arrays 670, 690 may together form a first beamforming array 640 that operates in the first frequency band, and the second and third sub-arrays 680, 690 may together form a second beamforming array 650 that operates in the second frequency band. It will be appreciated that the radiating elements 694 of the third sub-array 690 may be implemented using the multiband radiating elements according to embodiments of the present invention.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A radiating element, comprising:

a first dipole radiator that includes a first dipole arm and a second dipole arm;

a second dipole radiator that includes a third dipole arm and a fourth dipole arm; and first through fourth electromagnetic bandgap structures that are coupled to distal end portions of the respective first through fourth dipole arms.

2. The radiating element of claim 1, wherein each of the first through fourth electromagnetic bandgap structures comprises a reactively loaded transmission line and a dipole arm extension that is coupled to a distal end of the reactively loaded transmission line.

3. The radiating element of claim 2, wherein the radiating element comprises a dual band radiating element that is configured to transmit and receive radio frequency ("RF") signals in both a first frequency band and in a second frequency band that comprises higher frequencies than the first frequency band.

4. The radiating element of claim 3, wherein the first dipole radiator is configured to transmit and receive signals in the second frequency band, and wherein a combination of the first dipole radiator and the first and second electromagnetic bandgap structures are configured to transmit and receive signals in the first frequency band.

5. The radiating element of claim 3, wherein the radiating element is fed by a single feed line per polarization that is configured to pass RF signals in the first frequency band and in the second frequency band to and from the radiating element.

6. The radiating element of claim 3, wherein the first frequency band comprises at least a portion of the 1.427-2.690 GHz frequency band and the second frequency band comprises at least a portion of the 3.3-4.2 GHz frequency band.

7. The radiating element of claim 3, wherein the first frequency band comprises at least a portion of the 1.695-2.690 GHz frequency band and the second frequency band comprises at least a portion of the 3.3-4.2 GHz frequency band.

8. The radiating element of claim 3, wherein a bandwidth of the first frequency band and a bandwidth of the second frequency band are each at least 20% of the highest frequency in the second frequency band.

9. The radiating element of claim 3, wherein the difference between the highest frequency in the second frequency band and the lowest frequency in the first frequency band is at least 50% of the highest frequency in the second frequency band.

10. The radiating element of claim 3, wherein the first dipole radiator is fed by first and second feed lines, where the first feed line is configured to pass RF signals in the first frequency band to and from the first dipole radiator and the second feed line is configured to pass RF signals in the second frequency band to and from the first dipole radiator.

11. The radiating element of claim 2, wherein the first through fourth dipole arms and the first through fourth electromagnetic bandgap structures are formed on a printed circuit board.

12. The radiating element of claim 11, wherein the first through fourth dipole arms and the dipole arm extensions are formed on a first surface of the printed circuit board.

13. The radiating element of claim 12, wherein at least a portion of the reactively loaded transmission lines are formed on the first surface of the printed circuit board.

14. The radiating element of claim 12, wherein the first through fourth electromagnetic bandgap structures each include one or more conductive pads on a second surface of the printed circuit board that is opposite the first surface.

15. The radiating element of claim 14, wherein each of the conductive pads is electrically floating.

16. The radiating element of claim 1, wherein each electromagnetic bandgap structure comprises a plurality of unit cells.

17. The radiating element of claim 1, wherein each reactively loaded transmission line comprises an interdigitated finger capacitor and an inductor.

* * * * *